United States Patent
Rausch et al.

(10) Patent No.: US 8,204,035 B2
(45) Date of Patent: Jun. 19, 2012

(54) NETWORK NODE

(75) Inventors: Mathias Rausch, Markt Schwaben (DE); Christopher Temple, Munich (GB)

(73) Assignee: Freescale Semiconductor, Inc., Austin, TX (US)

(*) Notice: Subject to any disclaimer, the term of this patent is extended or adjusted under 35 U.S.C. 154(b) by 706 days.

(21) Appl. No.: 10/565,129

(22) PCT Filed: Jul. 15, 2004

(86) PCT No.: PCT/EP2004/051504
§ 371 (c)(1),
(2), (4) Date: Aug. 7, 2006

(87) PCT Pub. No.: WO2005/013523
PCT Pub. Date: Feb. 10, 2005

(65) Prior Publication Data
US 2007/0116058 A1    May 24, 2007

(30) Foreign Application Priority Data
Jul. 18, 2003  (GB) .................................. 0316876.2

(51) Int. Cl.
*H04J 3/06* (2006.01)

(52) U.S. Cl. ...................................... 370/350; 370/512

(58) Field of Classification Search .................. 370/223, 370/507, 503, 401, 357
See application file for complete search history.

(56) References Cited

U.S. PATENT DOCUMENTS

| 4,074,080 | A | | 2/1978 | Dragotinov et al. |
| 4,694,472 | A | | 9/1987 | Torok et al. |
| 5,276,659 | A | * | 1/1994 | Kotaki ............................ 368/10 |
| 5,724,397 | A | * | 3/1998 | Torsti ............................ 375/355 |
| 5,805,645 | A | * | 9/1998 | Przelomiec et al. ........... 375/354 |
| 6,970,448 | B1 | * | 11/2005 | Sparrell et al. ................. 370/347 |
| 7,058,729 | B1 | * | 6/2006 | Le Scolan et al. ............. 709/248 |
| 2002/0041607 | A1 | | 4/2002 | Spalink |
| 2002/0131452 | A1 | | 9/2002 | Bruckner et al. |

FOREIGN PATENT DOCUMENTS

| EP | 0718995 A1 | 6/1996 |
| EP | 1052793 A | 11/2000 |
| EP | 1198085 A1 | 4/2002 |
| EP | 1280024 A1 | 1/2003 |
| JP | 04033412 A | 2/1992 |
| JP | 11177591 A | 2/1999 |
| JP | 11341030 A | 12/1999 |

(Continued)

OTHER PUBLICATIONS

Kopetz et al; "A Synchronization Strategy for a Time-Triggered Multicluster Real-Time System": 14th IEEE Symposium on Reliable Distributed Systems, 1995.

(Continued)

*Primary Examiner* — Huy Vu
*Assistant Examiner* — Adnan Baig

(57) ABSTRACT

A computer node comprising a synchronization unit for comparing network timing information for a first network with network timing information for a second network and for communicating to the first network the sign of the difference between the first network timing information and the second network timing information to allow the first network to alter its network timing information using the sign of the difference to allow the network timing difference between the first network and the second network to be reduced.

20 Claims, 1 Drawing Sheet

FOREIGN PATENT DOCUMENTS

WO    99/62216 A2    12/1999

OTHER PUBLICATIONS

Great Britain Application No. GB0316876.2 Combined Search and Examination Report dated Nov. 11, 2003.

International Search Report and Written Opinion, Application No. PCT/EP2004/051504 dated Oct. 4, 2004.

Michael Paulitsch, "Fault-Tolerant Clock Synchronization for Embedded Distributed Multi-Cluster Systems," Dissertation, Sep. 2002, 155 pages.

* cited by examiner

NETWORK NODE

The present invention relates to a computer node for allowing synchronisation of a first network and a second network.

Time triggered communication/computer networks, which are used in safety critical applications, require that network tasks should be carried out in a predetermined sequence. Accordingly, nodes within a time triggered network should have a common time frame with clock synchronisation occurring between the nodes, where one example of clock synchronisation within a time triggered network is described in EP 1 280 024 A1. As such, it is important that a time triggered communication system has a known and guaranteed delay/response time.

However, to allow a time triggered based communication/computer system to operate over a wide area it is typically necessary for the system to comprise a group of interconnected time triggered networks, where a node within one of the group of networks is arranged to communicate with a node within another one of the group of networks via an interface node (e.g. a gateway) that allows data to pass from one network to another. Consequently, in addition to the requirement for synchronisation within a time triggered network it is also necessary to maintain synchronisation between interconnected time triggered networks, otherwise the delay of a message may jitter by the length of a whole communication cycle, which is highly undesirable for a real time system.

One technique for maintaining frequency (i.e. rate) and phase (i.e. offset) synchronisation between time triggered networks is for an inter-connecting network node to measure the frequency and phase difference between the inter-connected networks and to transmit to nodes on one of the inter-connected networks a clock correction value that indicates the correct frequency and/or phase value, thereby allowing the individual network nodes to correct their internal clock and maintain synchronisation with network nodes on the other inter-connected network.

Another technique, as disclosed in EP 1 052 793, is for a network node to determine the time difference between the clock pulses of a first network clock and the clock pulses of a second network clock and providing the time difference to a network node on the second network to allow the network node to adjust the clock of the second network by the determined time difference.

However, if a network node does not receive the clock correction value the node may not be able to maintain network synchronisation with the inter-connected network and the node may also loose local synchronisation with the other nodes within the same network.

It is desirable to improve this situation.

In accordance with a first aspect of the present invention there is provided a computer node according to claim 1.

This provides the advantage of allowing a network node to be brought into synchronisation with an inter-connected network in small steps, thereby allowing a node to maintain synchronisation with nodes on the same network even if the inter-connected network timing information is not received by the node.

In accordance with a second aspect of the present invention there is provided a method for synchronising a network node.

In accordance with a third aspect of the present invention there is provided a system.

An embodiment of the invention will now be described, by way of example, with reference to the drawings, of which:

Figure 1:
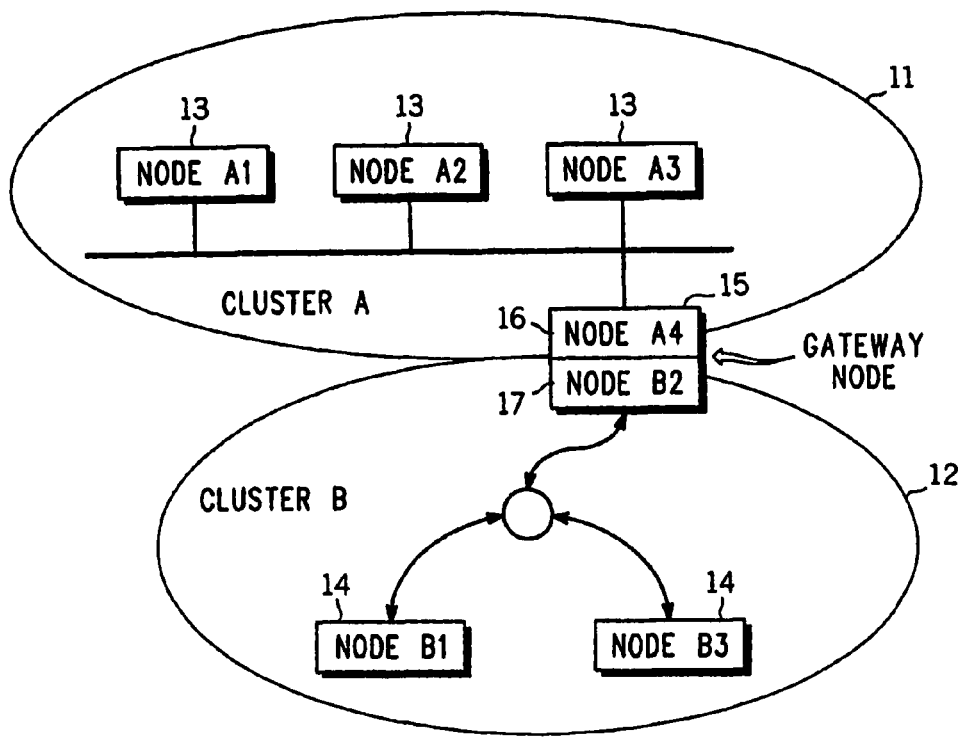
FIG. 1 shows a computer system according to an embodiment of the present invention.

FIG. 1 shows a communication/computer system 10 having a first network 11 and a second network 12. Each of the networks 11, 12 has a plurality of computer nodes 13, 14, where the first network 11 is coupled to the second network 12 via a gateway node 15. For the purposes of this embodiment the gateway node 15 can be regarded as two computer nodes that are coupled together, where one of the two computer nodes, which for the purposes of this description will be called the first computer node 16, is coupled to the first network 11 and the second of the two computer nodes 17, which for the purposes of this description will be called the second computer node 17, is coupled to the second network 12. However, any form of interface unit that is capable of being independently synchronised to both the first network 11 and second network 12 would be suitable.

Both the first network 11 and second network 12 form a time triggered network, where the nodes that form each network 13, 14 have a common time frame with clock synchronisation occurring between the nodes within each network 13, 14 (i.e. local synchronisation occurs between the nodes within each network), as described, for example, in EP 1 280 024. Accordingly, on start-up of the first network 11 and second network 12 the networks independently perform local synchronisation, thereby establishing a time base for each network. Any form of time triggered networks can be used, for example the network clusters used within a FlexRay system.

The nodes within each network 13, 14 incorporate an internal clock (not shown), which may, for example, be driven by a crystal oscillator. The internal clocks of the network nodes 13, 14 are arranged to allow a time base to be established and for local synchronisation to occur. Additionally, each node is provided with the timing and communication structure information for their respective network, where the information will typically include the number of slots within a communication cycle, the duration of a slot with a communication cycle and in which slot a node is allowed to transmit.

For the purpose of this embodiment the length of the communication cycle for both network clusters 11, 12 are nominally equal. Using the same configuration (communication cycle length, number of slots, etc.) for both networks makes the system easier to configure and to operate but different configurations for both networks 11, 12 are possible (for example, the networks can be arranged to have communication cycles that are not equal).

Typically data exchange between two synchronised networks is realized by saving the data from one network in the gateway node 15 and transmitting the saved data in a later, for example the next, slot on the other network. However, the network communication slots could be configured such that data received at a gateway node for one network could be transmitting in the same communication cycle on another network instantly and vice versa.

Figure 2:
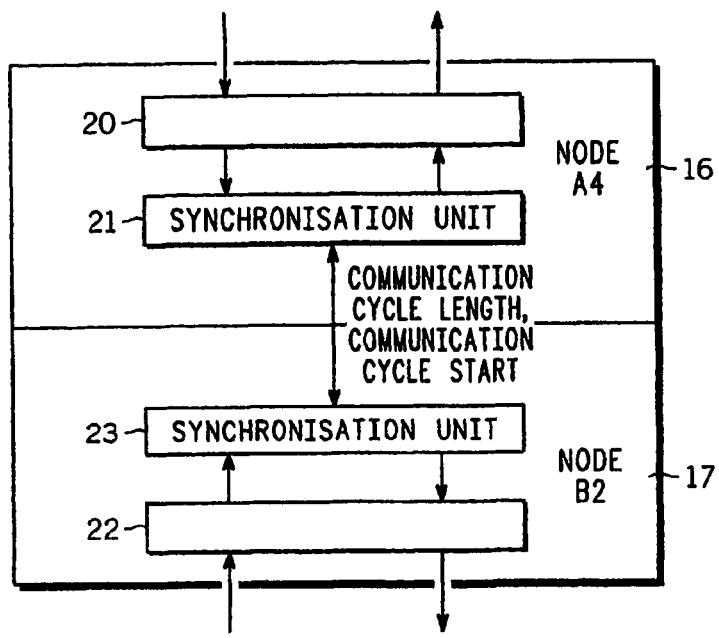
FIG. 2 shows a computer node according to an embodiment of the present invention.

FIG. 2 shows a simplified illustration of the gateway node 15 that comprises the first computer node 16 and second computer node 17.

The first computer node 16 inside the gateway node 15 has a first interface card 20 for coupling to the first network 11 and a first synchronisation unit 21. The second computer node 17 inside the gateway node 15 has a second interface card 22 for coupling to the second network 12 and a second synchronisation unit 23. The second synchronisation unit 23 is coupled to the first synchronisation unit 21 for coupling to the first synchronisation node 21.

The first synchronisation unit 21 is arranged to monitor network timing information for both the first network 11, via the first interface card 20, and the second network 12, via the second synchronisation unit 23.

The second synchronisation unit 23 is arranged to monitor network timing information for both the second network 12, via the second interface card 22, and the first network 11, via the first synchronisation unit 21. As such, the synchronisation units 21, 23 monitor the timing information (i.e. clocking information) for both the first network 11 and the second network 12.

The first synchronisation unit 21 and the second synchronisation unit 23 within the gateway node 15 operate independently without inter-network synchronization between the two synchronisation units 21, 23. Both synchronization units 21, 23 inside the gateway node 15 use the same timing source. To allow intra-network synchronization between the first network 11 and the second network 12 each synchronization unit 21, 23 calculates the communication cycle length (in other words the frequency) of the network to which they are directly coupled (i.e. the first network 11 for the first synchronisation unit 21 and the second network 12 for the second synchronisation unit 23) and then determines the difference between the communication cycle length of the respective networks. When the first network 11 and second network 12 are synchronised the communication cycle length for the first network 11 and second network 12 should be substantially the same.

The difference in the start of a communication cycle between the first network 11 and the second network 12 is called a phase offset between the networks. To determine the phase offset between both networks 11, 12 one of the synchronisation units 21, 23 provides a signal to the other synchronisation unit 21, 23 when the communication cycle, on the network to which the synchronisation unit 21, 23 is coupled, starts. The other synchronisation unit 21, 23 is then able to measure the time between the start of the communication cycle for the synchronisation unit's own network and the start of the communication cycle in the other network. Exchanging the timing information for the start of the communication cycle between both synchronisation units 21, 23 can happen in one direction or in both directions.

Based upon the timing information derived from the arrival time of received messages during one communication cycle and the timing information provided by the second synchronisation unit 23 the first synchronisation unit 21 is able to determine the phase offset between the network docking rate of the first network 11 and the second network 12 and can also calculate the difference in dock rate by calculating the change in phase offset between different communication cycles.

Correspondingly, based upon the timing information derived from the arrival time of received messages during one communication cycle and the timing information provided by the first synchronisation unit 21 the second synchronisation unit 23 is able to determine the phase offset between the network clocking rate of the first network 11 and the second network 12 and can also calculate the difference in clock rate by calculating the change in phase offset between different communication cycles.

Having made a determination of the phase offset and the clock rate (i.e. frequency and cycle length difference) between the clock of the first network 11 and the second network 12 the first synchronisation unit 21 and second synchronisation unit 23 make a determination as to whether the phase offset and/or the dock rate is larger than a minimum value.

If the amount of the clock rate difference and the phase offset between the clock of the first network 11 and the second network 12 are below a minimum value the dock rate and the phase offset are regarded as being within acceptable limits and no correction is made to the phase or to the clock rate of the clock for either the first network 11 or second network 12.

If the amount of the dock rate difference or the phase offset between the clock of the first network 11 and the second network 12 is above a minimum value the clock rate difference and/or phase offset are regarded as being outside acceptable limits.

If the phase offset and/or the clock rate difference between the clock of the first network 11 and second network 12 is outside acceptable limits the first synchronisation unit 21 transmits, within the allocated time slot for the first computer node 16, a correction message onto the first network 11 that indicates the sign of the difference of the phase offset of the clock rate between the first network 11 and second network 12.

This embodiment is based on the first synchronisation unit 21 providing a correction message to the first network 11, however, the second synchronisation unit 23 could be utilised to provide an appropriate correction message to the second network 12, which would have the advantage of increasing the speed at which the first network 11 and second network 12 reach synchronisation.

For a phase offset correction if the communication cycle of the first network 11 is ahead of the communication cycle of the second network 12 the first synchronisation unit 21 transmits a message that indicates that the communication cycle of the first network 11 is ahead of a communication cycle for the second network 12. If the communication cycle of the first network 11 is behind the communication cycle of the second network 12 the first synchronisation unit 21 transmits a message that indicates the communication cycle of the first network 11 is behind the communication cycle of the second network 12.

For example, the correction message could comprise two bits assigned to phase offset, where the coding '01' could be used to indicate that the start of the communication cycle of the first network 11 is earlier than the start of the communication cycle of the second network 12 and the coding '10' could be used to indicate that the start of the communication cycle of the first network 11 is later than the start of the communication cycle of the second network 12.

On receipt by the first network nodes 13 of a correction message that indicates that a phase offset correction is required the first network nodes 13 are arranged to increase or decrease their clock rate by a predetermined amount, which will preferably be the same for each network node, to make a correction to the length of the communication cycle of the first network 11. The value of the predetermined correction, applied by each network node 13, will typically be small enough to avoid the loss of local synchronisation by any individual node on the first network 11 should a node not receive the correction message.

During the next synchronisation period (i.e. the next communication double cycle) the first synchronisation unit 21 measures the phase offset again and if the phase offset between the first network 11 and second network 12 is still outside acceptable limits the first computer node 16 transmits another correction message indicating the sign of the different in phase offset between the first network 11 and second network 12, whereupon the nodes 13 of the first network 11 make an appropriate correction, as describe above. Phase corrections continue in this manner until the phase offset between the first network 11 and second network 12 are within acceptable limits.

The time that it will take to adjust to a common phase offset between the first network 11 and second network 12 will depend upon the difference in phase between the first network 11 and second network 12, the size of the predetermined steps by which the individual nodes adjust their communication cycle length and how often the first synchronisation unit 21 communicates a correction message.

For a clock rate difference, if the clock rate of the first network 11 is faster that the clock rate of the second network 12 the first synchronisation unit 21 transmits a message that indicates that the dock rate of the first network 11 is too fast. If the dock rate of the first network 11 is slower than the clock rate of the second network 12 the first synchronisation unit 21 transmits a message that indicates the clock rate of the first network 11 is too slow.

For example, the correction message could comprise two bits assigned to frequency difference, where the coding '01' could be used to indicate that the clock rate of the first network 11 is faster than the dock rate of the second network 12 and the coding '10' could be used to indicate that the dock rate of the first network 11 is slower than the clock rate of the second network 12. As a further enhancement the coding '00' could be used to indicate that the dock rate of both networks 11, 12 are synchronised within specified limits.

On receipt by the first network nodes 13 of a correction message that indicates that a frequency difference correction is required the first network nodes 13 are arranged to increase or decrease their clock rate by a predetermined amount, which will preferably be the same for each network node, to make a correction to the clock rate of the first network 11. The value of the predetermined correction, applied by each network node, will typically be small enough to avoid the loss of local synchronisation by any individual node on the first network 11 should a node not receive the correction message.

During the next synchronisation period (i.e. the next communication double cycle) the first synchronisation unit 21 measures the frequency difference again and if the frequency difference between the first network 11 and second network 12 is still outside acceptable limits the first synchronisation unit 21 transmits another correction message indicating the sign of the different in frequency between the first network 11 and second network 12, whereupon the nodes 13 of the first network 11 make an appropriate correction to their clock rate, as describe above. Frequency corrections continue in this manner until the frequency difference between the first network 11 and second network 12 are within acceptable limits.

The time that it will take to adjust to a common frequency between the first network 11 and second network 12 will depend upon the difference in frequency between the first network 11 and second network 12 when synchronisation commences, the size of the predetermined steps by which the individual nodes adjust their frequency and how often the first synchronisation unit 21 communicates a correction message.

It will be apparent to those skilled in the art that the disclosed subject matter may be modified in numerous ways and may assume many embodiments other than the preferred form specifically set out as described above, for example the above method could be used to with a single synchronisation unit for synchronising one network to another network, or could be used to synchronise more than two network clusters.

The invention claimed is:

1. A first computer node for operating in a system comprising a first network and a second network each having a local time base and comprising a plurality of computer nodes, the first computer node comprising:
    a synchronisation unit operable to:
        compare first network timing information indicative of a first local time base associated with the first network with second network timing information indicative of a second local time base associated with the second network and to determine a sign of the difference between the first network timing information and the second network timing information;
        in response to the difference between the first network timing information and the second network timing information exceeding a threshold, determine a first fixed code value based on a sign of the difference between the first network timing information and the second network timing information; and
        in response to the difference between the first network timing information and the second network timing information exceeding the threshold, communicate the first fixed code value to a second computer node to request a change in network timing information associated with the second computer node by a predetermined fixed step value sufficiently small to avoid loss of local synchronisation with the plurality of other computer nodes in the first network.

2. A computer node according to claim 1, wherein the network timing information corresponds to the phase of a network clock.

3. A first computer node according to claim 1, wherein the request to change the network timing information comprises a request to reduce the difference between the first network timing information and the second network timing information.

4. A first computer node according to claim 1, wherein the computer node is arranged to be coupled to the first network.

5. A first computer node according to claim 1, wherein the computer node is arranged to be coupled to the second network via a second computer node.

6. A device comprising:
    an interface coupled to a first network and operable to receive a fixed code value based on a sign of the difference between first network timing information associated with the first network and second network timing information associated with a second network; and
    a synchronization unit coupled to the interface and operable to adjust network timing information associated with the first network by a predetermined fixed amount based on the code value the predetermined fixed amount sufficiently small to avoid loss of local synchronization with another computer node in the first network.

7. A device according to claim 6, wherein the code value is a fixed code value.

8. A method comprising:
    comparing network timing information for a first network with network timing information for a second network; and
    receiving at a first network node a first fixed code value indicating a sign of the difference between first network timing information associated with the first network and second network timing information associated with the second network;
    adjusting the first network timing information by a predetermined fixed amount based in response to receiving the first code value the predetermined fixed amount sufficiently small to avoid loss of local synchronization with another computer node in the first network.

9. A first computer node according to claim 1, wherein difference between the first network timing information and the second network timing information indicates that a first communication cycle associated with the first network is ahead of a second communication cycle associated with the second network.

10. A first computer node according to claim 1, wherein the synchronization unit is arranged to measure a time between a start of a first communication cycle of the first network and a start of a second communication cycle of the second network.

11. A system device according to claim 6, wherein the sign of the difference between the first network timing information and the second network timing information indicates that a first communication cycle associated with the first network is ahead of a second communication cycle associated with the second network.

12. A device according to claim 6, wherein the synchronization unit is arranged to measure a time between a start of a first communication cycle of the first network and a start of a second communication cycle of the second network.

13. A method according to claim 8, further comprising determining the sign of the difference between the first network timing information and the second network timing information.

14. A method according to claim 13 further comprising determining the code value based on the sign of the difference between the first network timing information and the second network timing information.

15. The first computer node of claim 1, wherein the synchronization unit is operable to communicate a second fixed code value to the second computer node in response to determining the difference between the first network timing information and the second network timing information not exceeding the threshold.

16. The first computer node of claim 15, wherein the first fixed code value and the second fixed code value are each two bit binary values.

17. The first computer node of claim 1, wherein the first fixed code value is a two bit binary value.

18. The first computer node of claim 1, wherein the first fixed code value is a first value when the sign of the difference is positive and a second value when the sign of the difference is negative, and wherein second value is a complement of the first value.

19. The device of claim 6, wherein the fixed code value is a first value when the sign of the difference is positive and a second value when the sign of the difference is negative, and wherein second value is a complement of the first value.

20. The method of claim 8, wherein the first fixed code value is a first value when the sign of the difference is positive and a second value when the sign of the difference is negative, and wherein second value is a complement of the first value.

* * * * *